United States Patent
Sella et al.

(10) Patent No.: US 9,378,177 B2
(45) Date of Patent: Jun. 28, 2016

(54) WIFI USB PROTOCOL

(71) Applicant: TEXAS INSTRUMENTS INCORPORATED, Dallas, TX (US)

(72) Inventors: Assaf Sella, Rishpon (IL); Leonardo Estevez, Rowlett, TX (US); Nir Nitzani, Tel-Aviv (IL); Avi Baum, Giva't Shmuel (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 445 days.

(21) Appl. No.: 13/930,530

(22) Filed: Jun. 28, 2013

(65) Prior Publication Data

US 2014/0013018 A1   Jan. 9, 2014

Related U.S. Application Data

(60) Provisional application No. 61/668,891, filed on Jul. 6, 2012.

(51) Int. Cl.
*G06F 13/42* (2006.01)

(52) U.S. Cl.
CPC .............. *G06F 13/4295* (2013.01); *Y02B 60/50* (2013.01)

(58) Field of Classification Search
CPC . G06F 13/3625; G06F 13/4295; Y02B 60/50; H04W 525/0216
USPC .......................................... 710/117; 370/311
See application file for complete search history.

(56) References Cited

U.S. PATENT DOCUMENTS

| | | | | |
|---|---|---|---|---|
| 7,822,902 B2* | 10/2010 | Oh ........................ | G06F 13/385 | 710/105 |
| 8,331,332 B2* | 12/2012 | Kim .................. | H04W 72/1289 | 370/329 |
| 8,370,651 B2* | 2/2013 | Swaminathan ....... | G06F 1/3209 | 713/300 |
| 8,601,137 B2* | 12/2013 | Kong ..................... | H04L 41/06 | 709/223 |
| 8,625,449 B2* | 1/2014 | Nakamura .............. | H04W 4/18 | 370/252 |
| 8,904,408 B1* | 12/2014 | Gallagher .............. | G06F 13/38 | 710/21 |
| 2006/0092899 A1 | 5/2006 | Hong et al. | | |
| 2007/0260801 A1 | 11/2007 | Kwak et al. | | |
| 2008/0049700 A1* | 2/2008 | Shah ...................... | G01D 21/00 | 370/342 |
| 2009/0006676 A1* | 1/2009 | Sampat ................. | G06F 13/385 | 710/62 |
| 2010/0150115 A1 | 6/2010 | Kim | | |
| 2010/0180058 A1* | 7/2010 | Ihori ..................... | H04W 74/04 | 710/117 |
| 2010/0217901 A1* | 8/2010 | Han .................. | H04W 52/0274 | 710/106 |
| 2011/0090831 A1* | 4/2011 | Howard ............ | H04W 52/0225 | 370/311 |
| 2011/0130097 A1 | 6/2011 | Ejima | | |

OTHER PUBLICATIONS

Wireless Universal Serial Bus Specification Revision 1.0-303 Pages; Dated May 12, 2005.*

* cited by examiner

*Primary Examiner* — Brian Misiura
(74) *Attorney, Agent, or Firm* — Ronald O. Neerings; Frank D. Cimino

(57) ABSTRACT

A wireless universal serial bus (USB) system that includes a wireless USB host, a first wireless USB device, and a second wireless USB device. The wireless USB host is configured to wirelessly transmit a beacon over a wireless USB network based on a wireless USB protocol. The first and second wireless USB devices are configured to exchange wireless packets with the wireless USB host. The beacon designates the wireless USB network address access times for the first and second wireless USB devices.

20 Claims, 2 Drawing Sheets

WIFI USB PROTOCOL

CROSS-REFERENCE TO RELATED APPLICATION

The present application claims priority to U.S. Provisional Patent Application No. 61/668,891, filed on Jul. 6, 2012; which is hereby incorporated herein by reference.

BACKGROUND

With the increasingly rapid development of communication and network technologies, a wired network environment has evolved into a wireless network environment using radio waves in various frequency bands. To effectuate the connections between each apparatus in a wireless network environment, a wireless interface is needed. For example, recently, IrDA and Bluetooth have gained heavy attention. Among wireless interfaces being developed, a wireless universal serial bus (USB) interface has emerged and heavily developed due to its high speed transmissions and high compatibility with a personal computer, game machines, other electronic devices, etc.

Based on transmitting data via the wireless USB interface, a wireless USB system uses a host-centric architecture for data exchange between a wireless USB host and wireless USB devices, or simply nodes. An operation sequence of the wireless USB system starts with the wireless USB host periodically transmitting token packets to wireless USB devices for initiating data exchange between the host and devices. At a later time, when the wireless USB device is done exchanging data, the device may transmit an acknowledgement handshake packet to the wireless host so as to adjust data flow rate and prevent issues of under-flowing or over-flowing. This operation may consume a significant amount of bandwidth and power in a wireless USB system. Additionally, interference may be a problem as multiple wireless USB devices may attempt to transmit at the same time.

SUMMARY

The problems noted above are solved in large part by systems and methods for reducing power consumption and wireless communication interference in a wireless universal serial bus (USB) system. In some embodiments, a wireless USB system includes a wireless USB host, a first wireless USB device, and a second wireless USB device. The wireless USB host is configured to wirelessly transmit a beacon over a wireless USB network based on a wireless USB protocol. The first and second wireless USB devices are configured to exchange wireless packets with the wireless USB host. The beacon designates wireless USB network access times for the first and second wireless USB devices.

Another illustrative embodiment includes a wireless USB device that comprises a microcontroller and a transceiver coupled to the microcontroller. The transceiver is configured to receive a beacon and transmit to and receive data from a wireless USB host. The beacon designates wireless USB network access times for the wireless USB device.

Yet another illustrative embodiment is a method that comprises wireless USB devices receiving a beacon designating wireless USB network access times for the wireless device. The method also comprises the wireless USB device transitioning from a low power state to a high power state during the access time.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
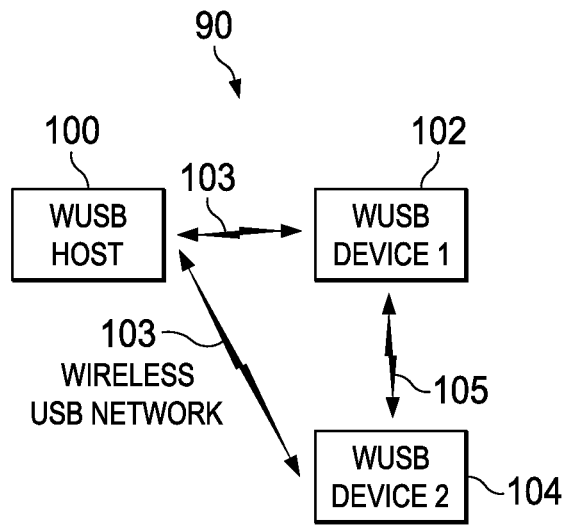
FIG. 1 shows a block diagram of an illustrative wireless universal serial bus (USB) system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are a system and method for reducing power consumption and wireless communication interference in a wireless universal serial bus (USB) system. More specifically, the system and the method of the present disclosure operate to reduce power consumption of each wireless USB device communicating wirelessly over the wireless USB system and packet interference in the wireless USB system. Based on the token-and-acknowledgement packet method described above for exchanging data in the wireless USB system, such systems may consume a significant amount of bandwidth and power. Embodiments of the present disclosure, however, address these problems by allowing each wireless USB device to communicate with a wireless USB host in the wireless USB system in a more efficient way without sacrificing unwanted power consumption and bandwidth.

To accomplish this, in accordance with the preferred embodiments, the wireless USB host may transmit a beacon identifying the wireless USB network access times for the wireless USB devices in the wireless USB system. Therefore, each wireless USB device may remain in a low power state until its access time. When a wireless USB device access time begins, the device may transition from the low power state into a high power state and then transmit and receive data to and from the host. Because each wireless USB device may have a different access time, interference between wireless USB devices in the wireless USB system is reduced.

FIG. 1 shows a block diagram of a wireless universal serial bus (USB) system 90 for communication amongst various devices via a wireless USB network 103 in accordance with various embodiments. The wireless system 90 may include a wireless USB host 100 and a plurality of wireless USB devices 102 and 104 and may utilize a star-shaped topology. The wireless USB devices 102 and 104 may also be referred to as wireless USB nodes or simply, nodes. Wireless USB devices 102 and 104 may be configured to wirelessly communicate with the wireless USB host 100 through the wireless USB network 103 based on a wireless USB protocol or standard. Thus, wireless USB devices 102 and 104 may exchange wireless packets with wireless USB host 100. Additionally, the USB devices 102 and 104 may form a peer-to-peer network, in which the wireless USB devices 102 and 104 wirelessly communicate with each other via peer-to-peer wireless USB network 105

To facilitate power consumption reduction and wireless USB interference reduction, the wireless USB host 100, in an embodiment, is configured to transmit a wireless message called a beacon to the wireless USB devices 102 and 104. The beacon contains information elements about the network and may be transmitted periodically by wireless USB host 100. The information elements designate the wireless USB network 90 access time for each designated wireless USB device 102 and 104. The access time designates when each of wireless USB devices 102 and 104 should transmit and receive data, utilizing wireless packets, to and from wireless USB host 100. The access time for each of wireless USB devices 102 and 104 may be a period of time with respect to the beacon. For example, the access time for USB device 102 may be designated as a 10 ms time period starting 20 ms after receiving the beacon. In an embodiment, the access time for wireless USB device 102 is at a different time than the access time for wireless USB device 104.

In an embodiment, wireless USB devices 102 and 104 remain in a low power state except when each of their respective access times arrives because each device does not otherwise need to actively transmit or receive data. When each of their access times starts, wireless devices 102 and 104 respectively transition from the low power state to a high power state. While in the high power state, wireless USB devices 102 and 104 transmit to and receive data from wireless host 100. Once the transmissions end, or at the end of the access time for each wireless USB device 102 and 104, the wireless USB devices 102 and 104 transition from the high power state to the low power state and await their next scheduled access times.

Because the wireless USB devices 102 and 104 remain in a low power state, except during each respective devices access time, power consumption of each device is reduced. Additionally, because data transmissions are scheduled between devices at different times, based on the access time identified in the beacon, interference is also reduced.

In an embodiment, wireless USB host 100 is configured to transmit a contention frame, to wireless USB devices 102 and 104. The contention frame contains information that identifies a delay in the access time for the wireless USB device 102 and/or 104 that receives the contention frame. In this way, the access time for the wireless USB devices 102 and/or 104 may be delayed. This delay may be desirable because other wireless USB devices may need to communicate with the wireless USB host 100 during the access time for the wireless USB device 102 and/or 104. Thus, to reduce interference, the access time may be delayed.

Figure 2:
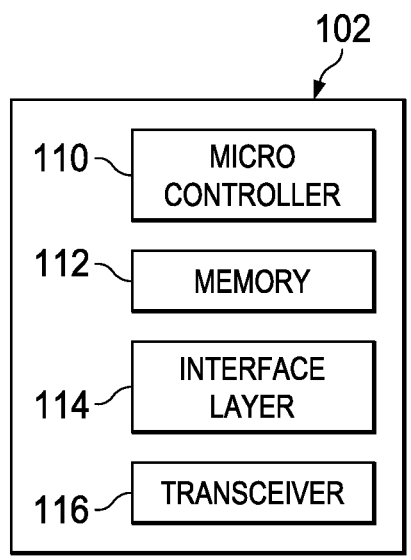
FIG. 2 shows a block diagram of an illustrative wireless USB device in accordance with various embodiments.

FIG. 2 illustrates a block diagram of an illustrative wireless USB device 102 in accordance with various embodiments. The wireless USB device 102 may include a microcontroller 110, a memory 112 coupled to the microcontroller, an interface layer 114, and a wireless transceiver 116 coupled to the microcontroller. The wireless transceiver 116 provides an interface through which the device 104 accesses the wireless USB network 103 in accordance with the wireless USB protocol. The transceiver 116, thus, may transmit and receive various wireless packets from wireless USB host 100. For example, the beacons comprising the information elements described above may be received from the wireless USB host 100 by the wireless transceiver 116. Wireless USB host 100 may have the same elements: a microcontroller, a transceiver, an interface layer, and a memory.

In some preferred embodiments, the beacons may be decoded in or based on a sequence of instructions within the interface layer 114. Microcontroller 110 may then read the instructions encoded in the interface layer 114 and then cause the transceiver 116 to receive beacons or start to exchange wireless packets during access times. Microcontroller 110 may be a general-purpose microprocessor or other instruction execution device suitable for use in a wireless device.

Memory 112 may be a semiconductor random access memory (RAM), such as static RAM (SRAM), or other volatile memory suitable for use in the wireless USB device 102. The memory 112 may also be a FLASH memory, electrically erasable programmable read-only memory (EEPROM), ferroelectric RAM (FRAM), or other non-volatile memory suitable for use in the wireless device 102. Memory 112 may store instructions that are executed by the microcontroller 110.

To effectuate the wireless USB communications in accordance with the embodiments, the beacon received by wireless USB device 102 from wireless USB host 100 may designate the wireless USB network 90 access times for wireless USB device 102. Wireless USB device 102 remains in the low power state until its access time arrives. Once the access time arrives, microcontroller 110 may cause transceiver 116 to transmit data to and receive data from wireless USB host 100. Thus, microcontroller 110 causes the wireless USB device 102 to transition from a low power state to a high power state once the access time arrives.

After transmitting the data to and/or receiving data from wireless USB host 100, or after the access time ends, microcontroller 110 causes wireless device 102 to transition from the high power state to the low power state. Thus, excessive power consumption for the wireless USB device 102 is reduced. Other wireless USB devices function similarly but at different access times.

In an embodiment, transceiver 116 may receive a contention frame. The contention frame contains information that identifies a delay in the access time for the wireless USB device 102. Once microcontroller 110 determines that a contention frame has been received by transceiver 116, microcontroller 116 delays the transition from low power state to high power state for the wireless USB device 102. In this way, the access time for the wireless USB device 102 is delayed.

Figure 3:
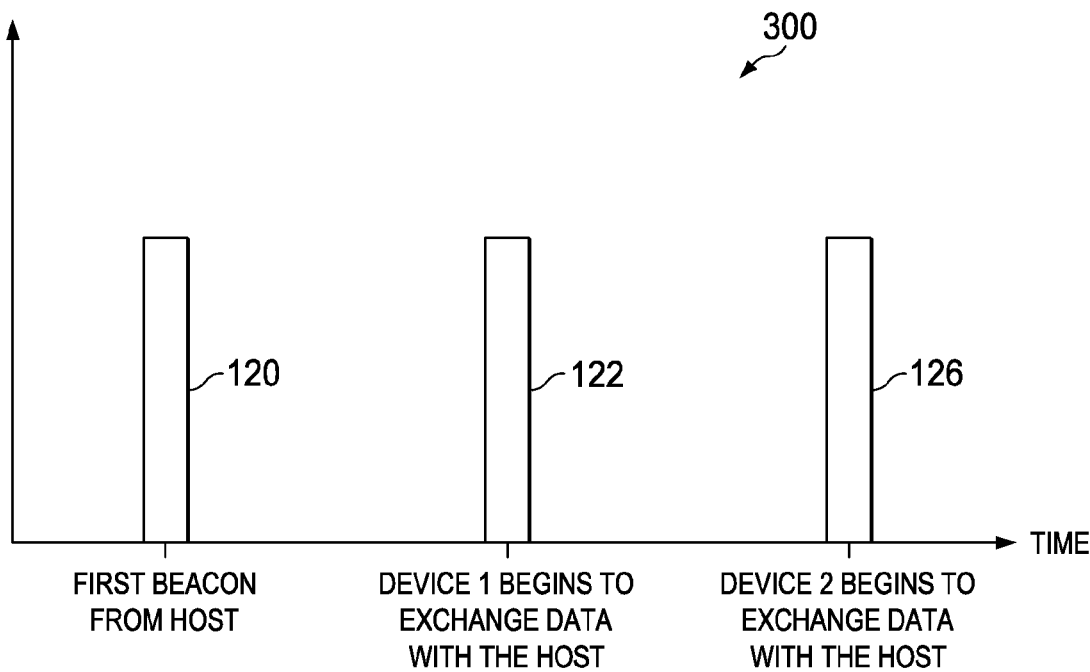
FIG. 3 shows an illustrative timeline of data exchanges in accordance with various embodiments.

FIG. 3 shows an illustrative timeline 300 of data exchanges in accordance with various embodiments. A first beacon 120 is transmitted from wireless USB host 100 to the wireless USB devices 102 and 104 through the wireless USB network 113. The first beacon designates medium and corresponding MAC address access times for the wireless USB devices 102 and 104. Once the access time 122 arrives for wireless USB device 102, device 102 transitions from the low power state to the high power state and starts to exchange wireless packets with the wireless USB host 100 using a designated MAC address. Exchanging wireless packets includes receiving data from the wireless USB host 100 and transmitting data to the wireless USB host 100. After the access time 122 ends, the wireless USB device 102 ceases exchanging wireless packets with the wireless USB host 100, and microcontroller 110 inside the wireless USB device 102 transitions the device 102 from the high power state to the low power state.

Following a similar procedure, once the access time 126 arrives for wireless USB device 104, device 104 transitions from the low power state to the high power state and, starts to exchange wireless packets with the wireless USB host 100 using the designated MAC address. After the access time 126 ends, the wireless USB device 104 ceases exchanging wireless packets with the wireless USB host 100, and a microcontroller inside the wireless USB device 104 transitions the device 104 from the high power state to the low power state.

Alternatively, or additionally, there may be more than two wireless USB devices in the wireless USB system 90. Sharing the same operational principle illustrated above, the wireless USB host 100 may transmit a beacon containing access times for each of the wireless USB devices in the wireless USB system 90. Each of the wireless USB devices then may transition from a low power state to a high power state during their own access times and exchange wireless packets with the wireless USB host 100 using the designated MAC address. Each of the wireless USB devices then may cease exchanging wireless packets with the wireless USB host 100, and a microcontroller within each wireless USB device may transition the device from the high power state to the low power state.

Figure 4:
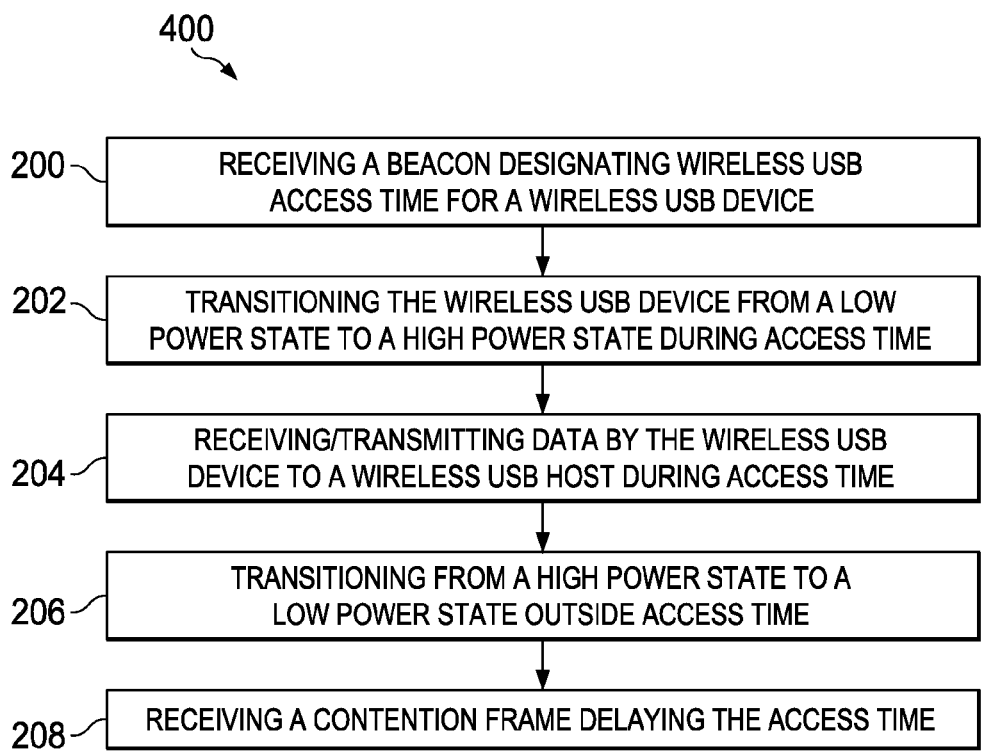
FIG. 4 shows a flow diagram of a wireless USB system method in accordance with various embodiments.

FIG. 4 shows a flow diagram 400 of a wireless USB system 90 method in accordance with various embodiments. At 200, a first wireless USB device 102 receives a beacon transmitted from wireless USB host 110 designating the wireless USB network 90 access time for the wireless USB device 102. At 202, the wireless USB device 102 transitions from a low power state to a high power state at the beginning of the access time designated in the beacon. The wireless USB device 102 remains in the high power state during the access time.

While the wireless USB device 102 is in the high power state, at 204, the wireless USB device 102 transmits data to and receives data from the wireless USB host 100. Once the access time for wireless USB device 102 has ended, the wireless USB device 102 stops receiving data from and transmitting data to the wireless USB host 100. Hence, at 206, the wireless USB device 102 transitions from the high power state to the low power state at the end of the access time. At block 208, the wireless USB device 102 receives a contention frame delaying the access time for the wireless USB device 102.

Following the same method as described above, a second wireless USB device 104 transitions itself to a high power state after receiving a beacon from the wireless USB host 100 identifying the access time for wireless USB device 104. Wireless USB device 104 then may transition back to a low power state once the access time ends. Furthermore, there may be more than two wireless USB devices in the wireless USB system 90. Each of the wireless USB devices in the USB system 90 may share the same method 400 to communicate with the wireless USB host 100 in the wireless USB system 90.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless universal serial bus (USB) system, comprising:
   a wireless USB host configured to wirelessly transmit a beacon and a contention frame over a wireless USB network based on a wireless USB protocol;
   wherein the beacon designates the wireless USB network access times for a first and second wireless USB devices; and
   wherein the contention frame delays an access time for the first wireless device.

2. The wireless USB system of claim 1, wherein the access times are transmitted in an information element of the beacon.

3. The wireless USB system of claim 1, wherein the access time for the first wireless USB device is at a different time than the access time for the second wireless device.

4. The wireless USB system of claim 3, wherein the first wireless USB device transitions from a low power state to a high power state during the access time for the first wireless USB device.

5. The wireless USB system of claim 4, wherein the first wireless USB device is configured, based on the first wireless USB device being in the high power state, to receive data transmissions from the wireless USB host.

6. The wireless USB system of claim 4, wherein the first wireless USB device transitions from a high power state to a low power state upon expiration of the access time for the first wireless USB device.

7. The wireless USB system of claim 1, wherein the system is in a star-shaped topology.

8. The wireless USB system of claim 1, further comprising:
   the first wireless USB device configured to exchange wireless packets with the wireless USB host based on the wireless USB protocol; and
   the second wireless USB device configured to exchange wireless packets with the wireless USB host based on the wireless USB protocol.

9. A wireless universal serial bus (USB) device, comprising:
   a microcontroller; and
   a transceiver coupled to the microcontroller, the transceiver configured to receive a beacon, receive a contention frame, and transmit to and receive data from a wireless USB host;
   wherein the beacon designates wireless USB network access times for the wireless USB device; and
   wherein the contention frame delays an access time.

10. The wireless USB device of claim 9, wherein the access times are received in an information element of the beacon.

11. The wireless USB device of claim 9, wherein the microcontroller transitions from a low power state to a high power state during the access time.

12. The wireless USB device of claim 11, wherein the microcontroller is configured, based on the microcontroller being in the high power state, to cause the transceiver to receive data transmissions from the wireless USB host.

13. The wireless USB device of claim 11, wherein the microcontroller is configured to transition from a high power state to a low power state outside of the access time.

14. A method comprising:
- receiving, by a wireless universal serial bus (USB) device, a beacon designating wireless USB network access times for the wireless USB device;
- transitioning, by the wireless USB device, from a low power state to a high power state during an access time; and
- receiving, by the wireless USB device, a contention flame delaying the access time.

15. The method of claim 14, further comprising transitioning, by the wireless USB device, from a high power state to a low power state outside of the access time.

16. The method of claim 14, further comprising, transmitting data, by the wireless USB device, to a wireless USB host during the access time.

17. The method of claim 14, further comprising, receiving data, by the wireless USB device, from a wireless USB host during the access time.

18. The wireless USB system of claim 1, wherein the access times designated by the beacon are periods of time with respect to the beacon.

19. The wireless USB device of claim 9, further comprising an interface layer configured to decode the beacon.

20. The method of claim 14, further comprising decoding, by an interface layer of the wireless USB device, the beacon to determine the access times for the wireless USB device.

\* \* \* \* \*